July 30, 1929. G. V. BLACKFORD Re. 17,382

AWNING FOR AUTOMOBILE DOORS

Original Filed July 3, 1926 2 Sheets-Sheet 1

Inventor
Gilbert V. Blackford
By Paul, Paul & Moore
Attorneys

July 30, 1929. G. V. BLACKFORD Re. 17,382

AWNING FOR AUTOMOBILE DOORS

Original Filed July 3, 1926 2 Sheets-Sheet 2

Inventor
Gilbert V. Blackford
By Paul, Paul & Moore
Attorneys

Reissued July 30, 1929. Re. 17,382

UNITED STATES PATENT OFFICE.

GILBERT V. BLACKFORD, OF INDEPENDENCE, KANSAS, ASSIGNOR OF ONE-HALF TO WILLIAM R. HOBBS, OF INDEPENDENCE, KANSAS.

AWNING FOR AUTOMOBILE DOORS.

Original No. 1,625,785, dated April 26, 1927, Serial No. 120,365, filed July 3, 1926. Application for reissue filed November 12, 1928. Serial No. 318,968.

This invention relates generally to automobiles of the closed type and has more particular reference to an awning construction for windows or doors thereof. The primary object of the invention is the provision of a simple device of this character which can be detachably disposed within a window or door opening of a conventionally constructed automobile so as to permit the openings or windows to be shaded.

An additional object is to provide an awning construction that can be readily attached or detached, and that will in no way require any alteration of the automobile window frame, and that will not require the permanent attachment of brackets, arms, rods or the like to the window, or any attachment which will result in marring the frame work. Other objects are to provide a device whereing the awning fabric per se may be moved to shading position or readily raised, and wherein the awning fabric may be extended outwardly to the desired position and therein maintained; to provide a combination in which constant force is exerted by the roller spring to cause an awning control element to be held in any adjusted position; and to provide a very simple adjusting connection between the awning control member and a support attached in the window opening, in which the support and control member have portions cooperable as stops to secure the frame in one or in a plurality of adjusted positions, and to accomplish the adjustment by simple translation of the awning control member with reference to the support.

Other objects will become apparent as the nature of the invention is better understood the same comprising the novel form, combination and arrangement of parts hereinafter more fully described, shown in the accompanying drawings and claimed.

In the drawings

Figure 7:
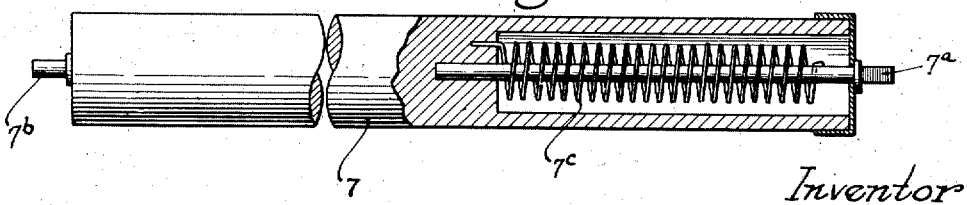
Figure 5:
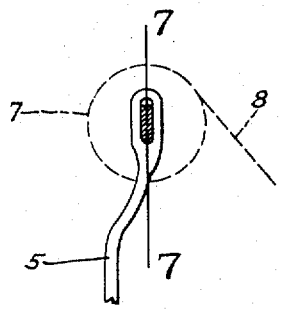
Figure 4:
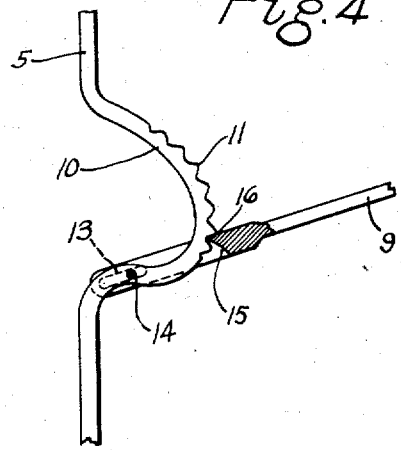
Figure 6:
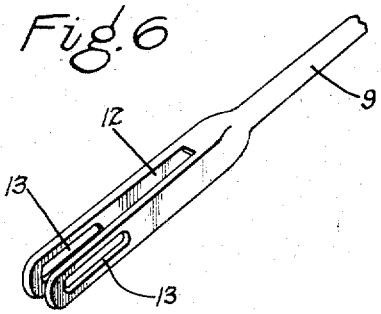

Figure 4 is an enlarged fragmentary view partly in side elevation, and partly in cross section disclosing one side bar of the awning window attaching frame, and one side arm of an awning attached frame pivotally associated with said attaching frame, said bar and said arm being complementally constructed for retaining the awning-attached frame to be retained at adjusted positions with respect to the attaching frame support;

Figure 5 is a view of the upper end of one of the attaching frame arms formed by the vertical slot for receiving the flat pintle carried by one end of a spring roller;

Figure 6 is an enlarged perspective of the inner end of one of the awning-attached frame arms so constructed as to permit the sliding pivotal attachment of the same to the adjacent bar of the awning attaching frame; and Figure 7 is a section through the roller on line 7—7 of Figure 5, showing that no detent is provided to prevent forced rotation of the roller under influence of the spring.

Now having particular reference to the drawings, A indicates a closed automobile body door constructed at its upper end with an open window frame B within which is vertically slidable a window pane C, the door A being pocketed at D which is conventional for receiving the pane when the same is lowered.

Figure 1:
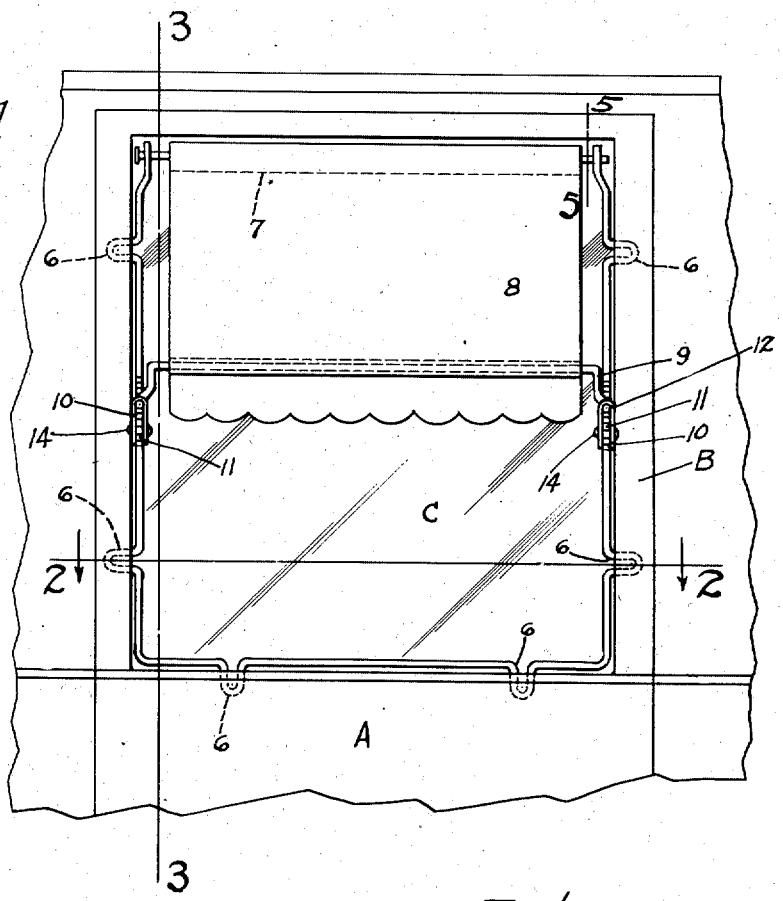
Figure 1 is a fragmentary side elevation of a closed automobile body, the particular door disclosed being equipped with an awning arrangement constructed in accordance with the present invention.
Figure 2:
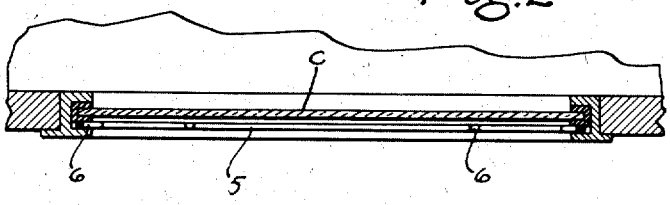
Figure 2 is a detail horizontal section taken substantially on line 2—2 of Figure 1.
Figure 3:
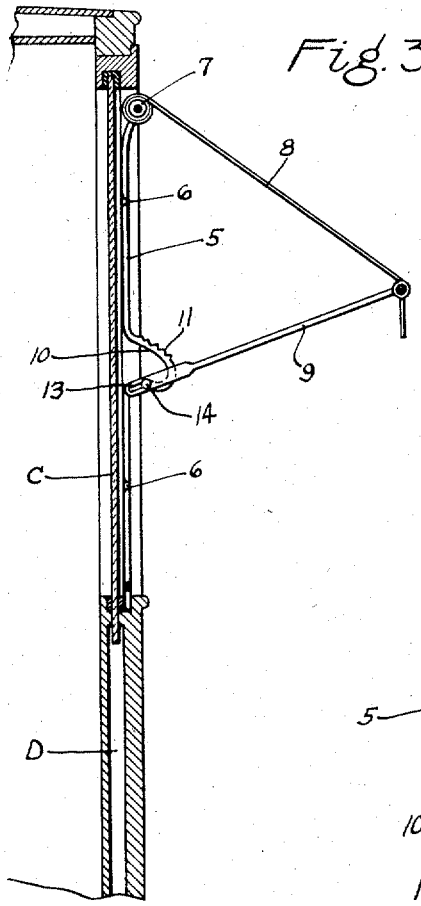
Figure 3 is a detail vertical section taken substantially on line 3—3 of Figure 1.

One of the features of the present invention is the formation of a supporting frame from wire or similar cheap bendable material, providing the frame with curtain roller supporting elements, and further providing it with stops with which an awning adjustaing member is engageable to releasably set this member at proper angular positions. In one application of the invention, an attaching frame 5 is provided having a generally U-shaped formation and of substantially the same area as that of the inside of the frame B. The vertical and horizontal portions of this frame, in this instance, each have formed thereon a plurality of outwardly extending tongues 6. The tongues of the lower horizontal portion are arranged within the usual horizontal channel of the door A outwardly with respect to the usual packing, while the tongues of the vertical side bars are arranged within the usual channel at the sides of the frame B, also outwardly of the packing strips, as clearly indicated in Figures 2 and 3.

The frame is constructed of bendable material and the vertical arms can be brought toward one another sufficiently to allow the frame to be placed in opposition to the channels and then moved outwardly to cause the tongues or projections to engage with the channels. The upper ends of the vertical arms are formed respectively with a vertical slot and a circular opening for respectively receiving the flat and rounded pintles at the opposite ends of a spring roller 7 which is mounted between the arms as shown. This spring roller may be of any preferred form, only in the present instance no means is provided for preventing the forced rotation of the same under influence of the usual spring, in other words the normal tendency of the roller is at all times to rotate in a winding up direction. Referring to Figure 7, the flat pintle is shown at $7^a$, the round pintle at $7^b$, and the spring at $7^c$. No ratchet or detent means connects roller 7 and pintle $7^a$. This is a valuable feature of the invention, as will be hereinafter more fully set forth, because this spring operating constantly is the sole means for supplying force by which the cooperating stop portions respectively of the awning control member and of a support are held in operative position.

Attached to the roller is one end of a flexible awning strip 8, the outer end of which is attached to the horizontal cross bar of a relatively U-shaped frame 9, as an awning-adjusting member.

A feature of the invention includes the arrangement and proportioning of the parts so that that portion of the awning control element 9 which connects with the curtain will lie immediately adjacent the roller when the awning is not functioning as a shade, as when full raised, and so that the control element 9 will lie in substantial parallelism with the frame, immediately there-adjacent, the roller spring constantly acting to draw the element 9 towards the roller, and said adjusting element therefore being entrained by the action of the roller spring and being free to move to an inconspicuous position when not in use, thereby also allowing entrance of a maximum amount of light, when the shade is not in use.

Intermediately the ends of the vertical arms of the attaching frame 5, the same are so bent as to provide forwardly extending nose members 10—10 upon the outer surface of the inclined portion of which are ratchet teeth or stops 11.

The inner ends of the side arms of the frame 9 are in this instance of square shape, and in this instance are longitudinally bifurcated as at 12, the inner ends of the bifurcations being longitudinally slotted as at 13—13. The bifurcated ends of the arms of the frame 9 are arranged over the nose members 10—10 of the vertical bars of the frame and are slidably pivotally connected to the bottoms of the nose members by horizontal pivot pins 14 that extend through bars of the frame member 5, and through the slots 13—13 of the bifurcations at the inner ends of the arms of the frame 9. The awning control member 9 can therefore be translated inwardly and outwardly and can be swung.

It will however be understood that the bifurcation is not necessary because the slidable pivotal connection may be as well made without this particular construction. Nevertheless the bifurcation provides means for preventing lateral motion of the awning adjusting element 9.

Upon the frame 9 is formed a stop, in this instance by beveling at 15 at the inner end of the bifurcation to provide a ratchet tooth-engaging lip or stop 16 which will engage beneath the teeth or stops 11 of the nose members, when the frame 9 is translated inwardly, for maintaining the awning strip 8 in the desired extended position. Obviously by drawing outwardly upon the awning adjusting frame 9 the lip 16 will be disengaged from the ratchet teeth whereupon the awning shade will be wound upon the roller. The action of the roller spring thus maintains the lip in engagement with the teeth at all adjusted positions, and also acts to prevent translation of the element 9 in a direction away from the teeth or radially of the pivot 14. This construction broadly provides cooperable stops respectively carried by the awning control member and support 10 which are disengageable from one another by a translative movement of the control member, the pivotal connection permitting swinging of the member after such disengagement.

In view of the foregoing description, when considered in conjunction with the accompanying drawing, it will at once be apparent that a highly novel and efficient form of shade construction for automobile body doors or windows has been provided. It will further be apparent that the device is well adapted for all the purposes heretofore designated, and even though I have herein shown and described the most preferred embodiment of the invention with which I am at this time familiar, it is nevertheless to be understood that other modifications may be had without affecting the spirit and scope of the invention.

To recapitulate: The device provides means whereby a spring curtain roller acting through an awning upon an awning-adjusting member causes this adjusting member through means of stops to be maintained in any adjusted position entirely by the action and constantly through the action of the roller spring; provides means whereby by simple translative movement of an awning-adjusting means the same can be disengaged, swung and re-engaged with any particular stop; provides means as a curtain-supporting and manipulating structure all having a common mounting; provides means whereby the ordinary glass-receiving channel of the window is utilized to cooperate with the frame to detachably secure it, and to have in this slidable cooperation the sole means for securing it; to provide a very cheap ratchet or stop construction for the awning-adjusting and control member; and generally to provide a cheap and efficient construction for all the purposes mentioned.

I claim as my invention:

1. In an awning construction for automobiles, including a window frame having channels. a wire frame having tongues engageable with the channels to removably secure said wire frame, said frame having three sides and being open at the top, a spring roller journaled for rotation at the top of said frame, a curtain attached to the roller, an adjusting element secured to the curtain, and means pivotally and slidably connecting said element to the wire frame, said frame and curtain adjusting element having portions cooperable as stops to secure the adjusting element in different angular relations with respect to the wire frame and window opening.

2. In an awning construction for automobile doors including a door having a window frame, a relatively U-shaped wire frame adapted for removable disposition within the window frame of the door, outwardly extending tongues formed on the arms and base portion of the U-shaped frame and adapted to fit in the channeled sides and bottom respectively of the window frame, a spring roller journaled for rotation between the upper ends of the arms of the U-shaped frame, a curtain attached at one end to the roller and adapted to be normally wound therearound, and an additional U-shaped frame, the free end of the curtain being secured to the crown portion of said frame, the ends of the arms of the second mentioned U-shaped frame being pivotally secured to the respective arms of the first mentioned U-shaped frame, and means for holding the pivoted frame in various adjusted positions with respect to the stationary frame.

3. In an awning construction for automobile doors including a door having a window frame, a relatively U-shaped frame adapted for removable disposition in the window frame of the door, forwardly extending nose members formed on the arms of the U-shaped frame, ratchet teeth formed on the outer edge of the nose, a spring roller journaled for rotation between the upper ends of the arms of said U-shaped frame, a curtain attached at one end to the roller and adapted to be normally wound therearound, a second U-shaped frame, the other end of the curtain being attached to the crown portion of the second U-shaped frame, the free ends of the arms of the second U-shaped frame being bifurcated and pivotally secured to the respective arms of the first mentioned frame at a point directly below the nose members, a ratchet teeth engaging lip formed at the inner end of each of the bifurcated portions of said second frame for holding the pivoted frame in various adjusted positions with respect to the stationary main frame, said second frame being adapted for outward sliding movement to disengage the lip from the ratchet teeth and permit the curtain to be wound around the spring roller.

4. In an awning construction, a spring roller having an awning thereon, a support having stops facing away from the roller, an adjusting element connected to the awning, means pivotally and slidably connecting said element to said support at a point adjacent the stops, said adjusting element having a stop to engage any one of the first mentioned stops, said element being thus adapted to be held in fixed position by engagement of said stops by force applied thereto by the roller through the awning.

5. In an awning construction, a spring roller having an awning thereon, a support having stops substantially circularly arranged and facing away from the roller, an adjusting element connected to the awning, means pivotally and slidably connecting said element to said support at a point adjacent the stops and substantially at the center of curvature of the stops, said adjusting element having a stop engageable with any one of the first mentioned stops, said element being thus adapted to be held in fixed position by engagement of said stops by force applied thereto by the roller through the awning.

6. A spring roller having an awning thereon, an adjusting element connected to the awning, a member having stops, means supporting the adjusting element and adapting it to be swung and to be translated in a manner to cooperate with any stop to secure it against swinging, and the rotative axis of the roller, the pivotal center of the adjusting element, and the point of connection of said adjusting element with the awning being so arranged as to be related substantially as the corners of a triangle for all stop-engaged positions of said element, the parts being thus so related that force can be constantly applied by the spring roller through the awning, to maintain the translative tendency of said adjusting element toward a stop, and so that said adjusting element is disengageable from any stop only by force manually applied against the action of the spring roller.

7. In an awning construction for automobile doors, wherein the same includes a window frame, the sides and bottom of which are channeled, a relatively U-shaped wire frame adapted for removable disposition within the window frame of the door, outwardly extending tongues formed on the arms and base portion of the U-shaped frame and adapted to fit in the channeled sides and bottom respectively of the window frame, and means on said frame adapted to support a curtain.

8. A spring roller having an awning thereon, an adjusting element connected to the awning, means supporting the adjusting element and adapting it to be swung and to be translated, stop means, said adjusting element having stop means adapted to be engaged with said first mentioned stop means by a translative motion of said adjusting element and in a manner to secure the adjusting element against swinging, and the rotative axis of the roller, the pivotal center of the adjusting element, and the point of connection of said adjusting element with the awning being so arranged as to be related substantially as the corners of a triangle for all stop-engaged positions, the parts being thus so related that force can be constantly applied by the spring roller through the awning to maintain the translative tendency of said adjusting element to hold the stops in engaged relation, and so that said adjusting element is disengageable from stop engagement only by force manually applied against the action of the spring roller.

In witness whereof I have hereunto set my hand this 3rd day of November, 1928.

GILBERT V. BLACKFORD.